No. 12,635. REISSUED APR. 16, 1907.

H. SOELDNER.

OIL ENGINE.

APPLICATION FILED JULY 6, 1905.

4 SHEETS—SHEET 1.

Witnesses:
Albert T. Day
Bernard Gowen

Inventor:
Henry Soeldner
by Henry D. Williams
Atty.

No. 12,635. REISSUED APR. 16, 1907.
H. SOELDNER.
OIL ENGINE.
APPLICATION FILED JULY 6, 1905.
4 SHEETS—SHEET 2.
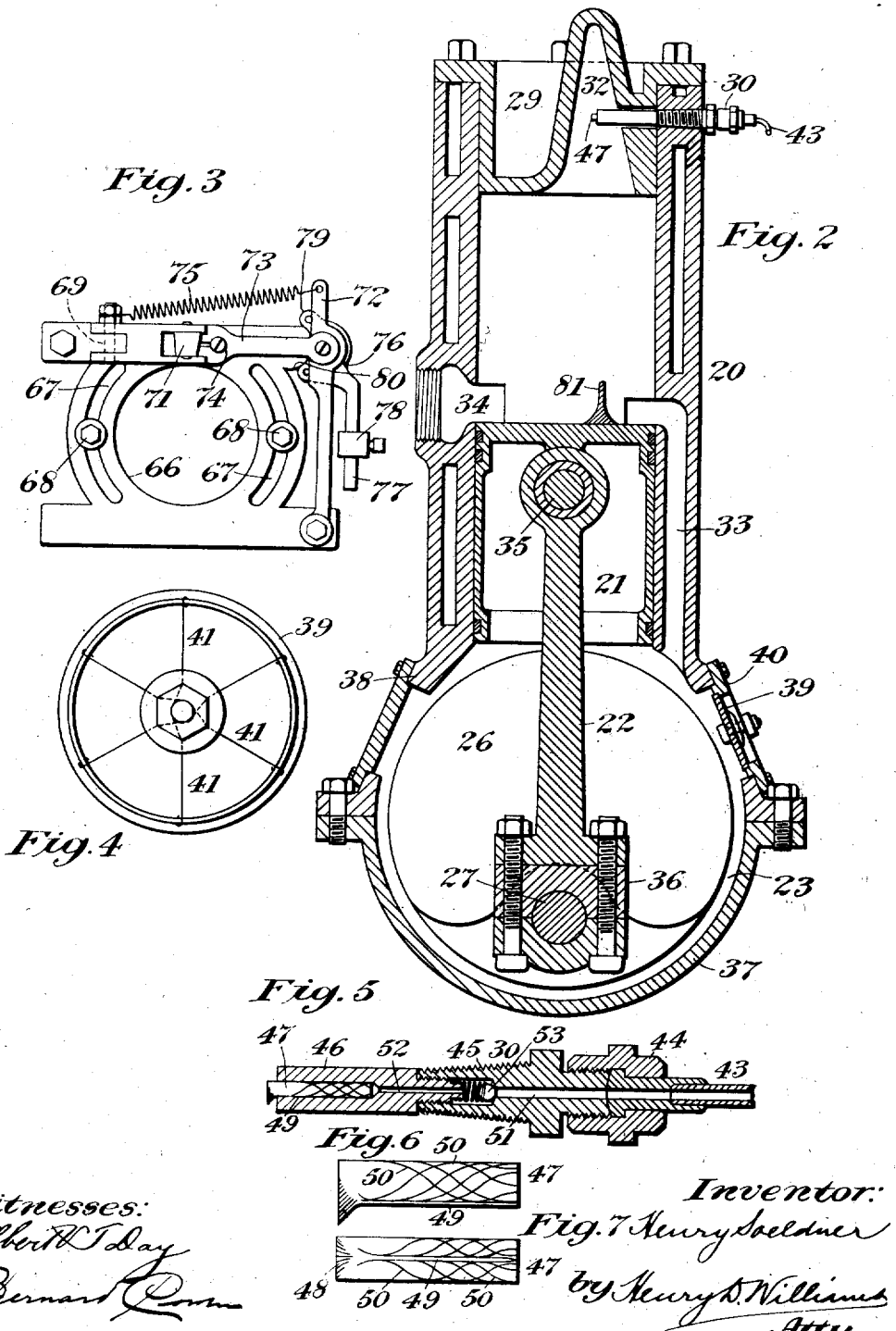
Witnesses:
Albert T. Day
Bernard Conn
Inventor:
Henry Soeldner
by Henry D. Williams
Atty.

No. 12,635. REISSUED APR. 16, 1907.

H. SOELDNER.

OIL ENGINE.

APPLICATION FILED JULY 6, 1905.

4 SHEETS—SHEET 3.

Witnesses:
Albert W. Day
Bernard Lowen

Inventor:
Henry Soeldner
by Henry B. Williams
Atty.

No. 12,635. REISSUED APR. 16, 1907.

H. SOELDNER.

OIL ENGINE.

APPLICATION FILED JULY 6, 1905.

4 SHEETS—SHEET 4.

Witnesses:
Albert W. Day
Bernard Lamm

Inventor:
Henry Soeldner
by Henry B. Williams
Atty.

UNITED STATES PATENT OFFICE.

HENRY SOELDNER, OF EAST WILLIAMSBURG, NEW YORK, ASSIGNOR TO THE DE LA VERGNE MACHINE COMPANY, OF NEW YORK, N. Y., A CORPORATION OF NEW YORK.

OIL-ENGINE.

No. 12,635. Specification of Reissued Letters Patent. Reissued April 16, 1907.

Original No. 740,195, dated September 29, 1903. Application for reissue filed July 6, 1905. Serial No. 268,560.

*To all whom it may concern:*

Be it known that I, HENRY SOELDNER, a citizen of the United States, and a resident of East Williamsburg, in the county of Queens and State of New York, have invented certain new and useful Improvements in Oil-Engines, of which the following is a specification.

The invention relates to improvements in oil-engines; and it consists in the novel features, arrangements, and combinations of parts hereinafter described, and particularly pointed out in the claims.

The object of the invention is to produce an entirely efficient oil-engine of simple and comparatively inexpensive character and adapted for marine and other uses.

The invention will be fully understood from the detailed description hereinafter presented, reference being had to the accompanying drawings, in which—

Figure 1:
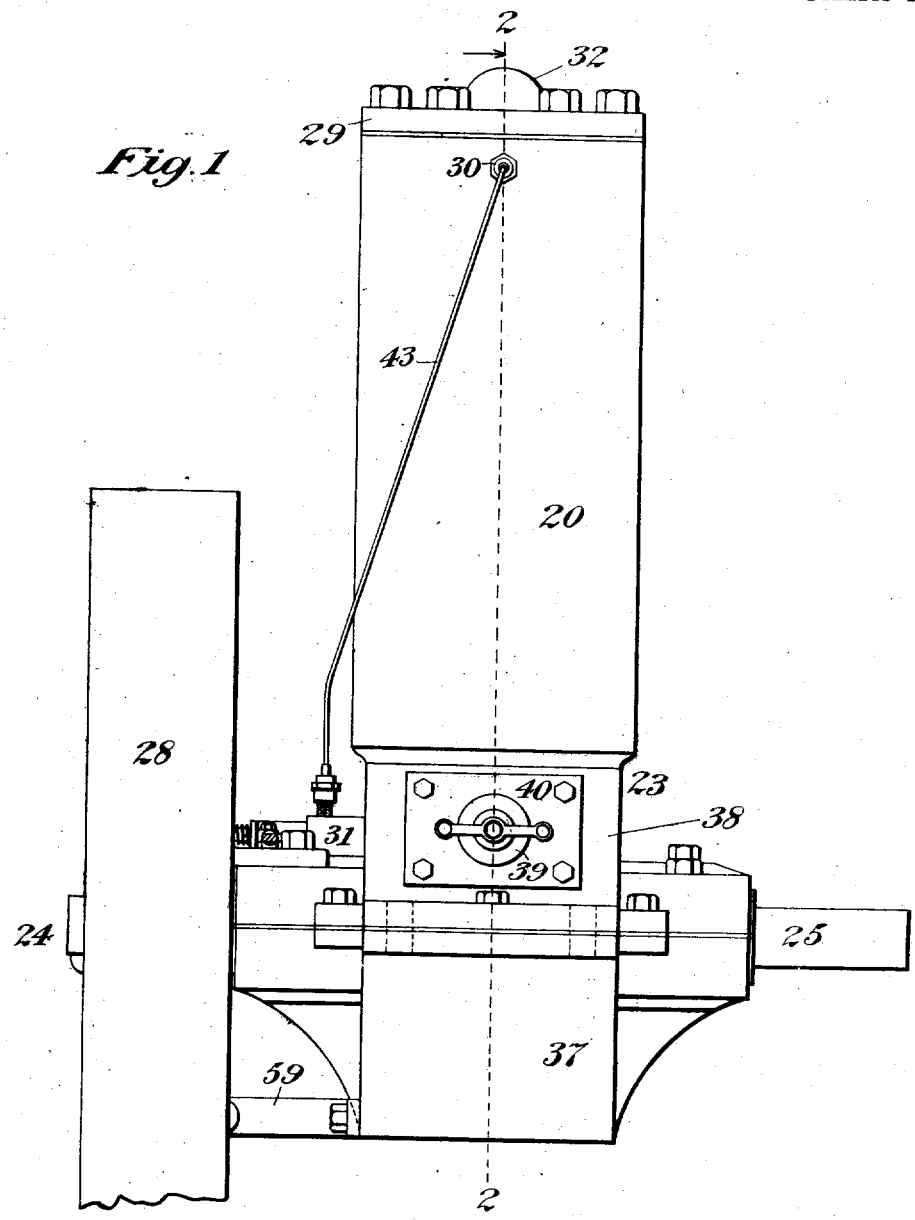
Figure 8:
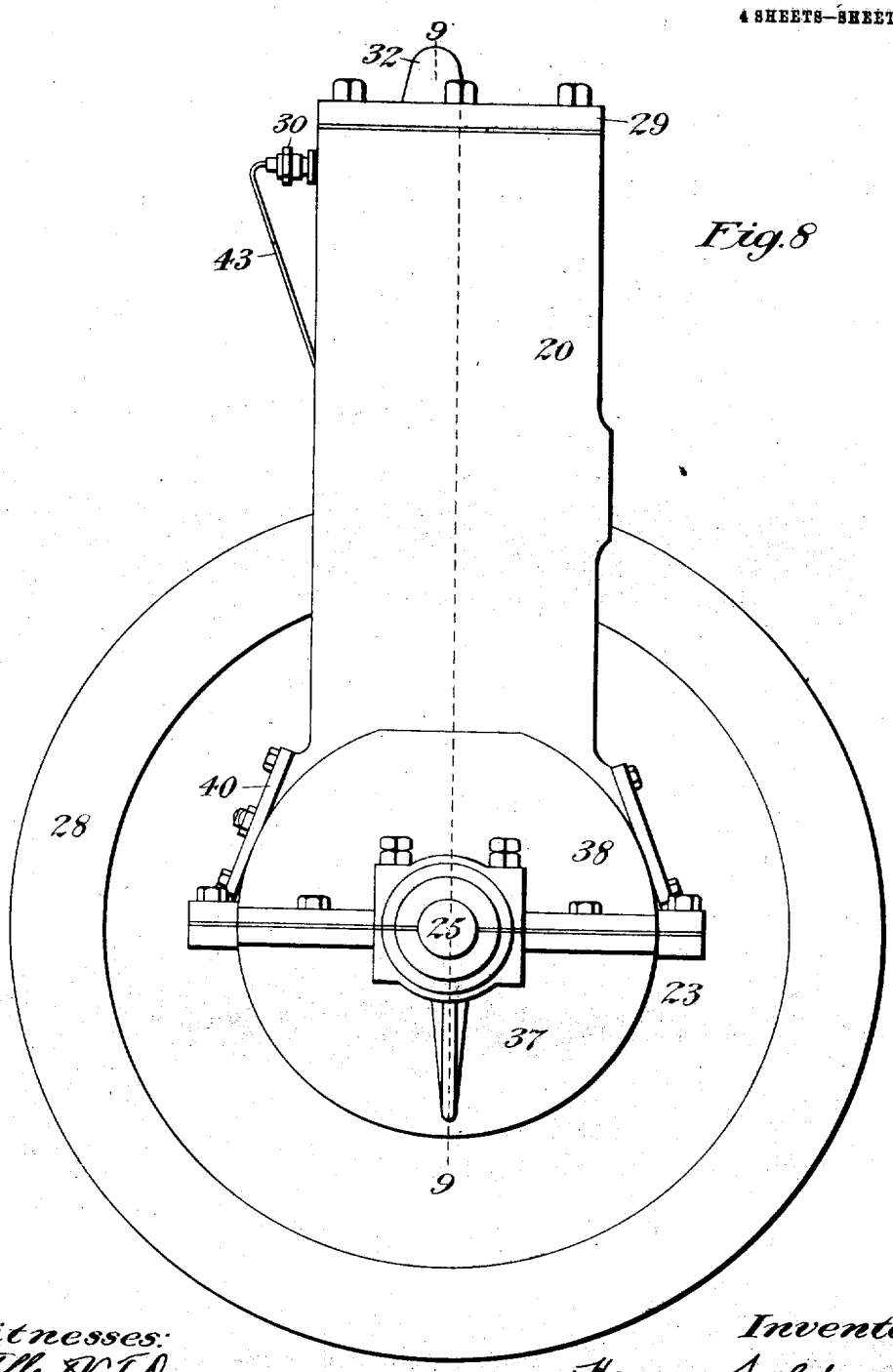
Figure 10:
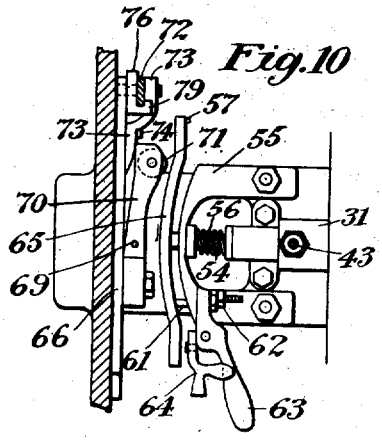
Figure 9:
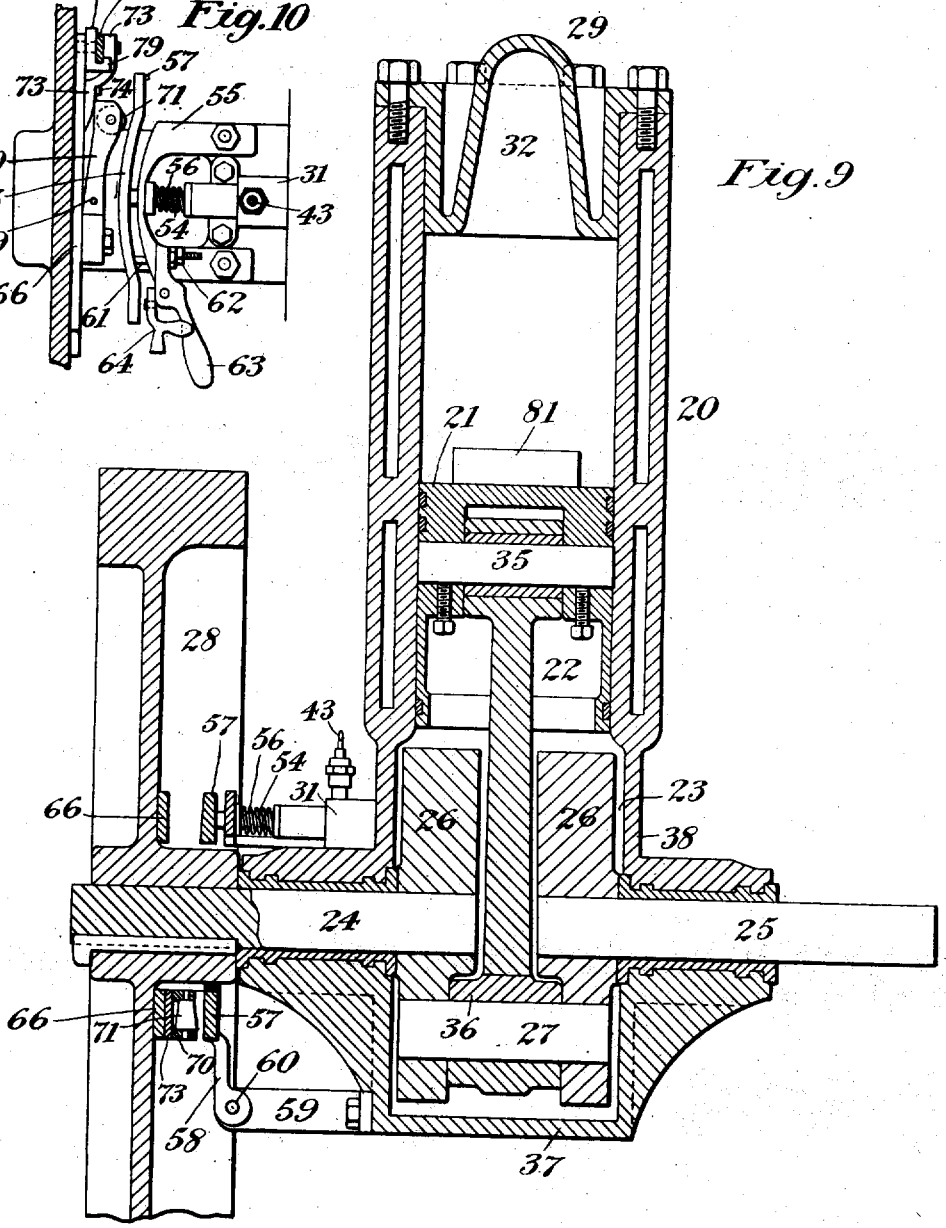

Figure 1 is a front elevation, partly broken away, of an oil-engine constructed in accordance with and embodying the invention. Fig. 2 is a vertical section of same on the dotted line 2 2 of Fig. 1. Fig. 3 is a detached elevation of the governing mechanism. Fig. 4 is an enlarged detached elevation of a check-valve for admitting air to the crank chamber of the engine. Fig. 5 is an enlarged detached horizontal longitudinal section of the nozzle and its parts through which the oil in the form of a dry vapor is admitted to the chamber in the head of the cylinder. Figs. 6 and 7 are enlarged detached views of the deflector at the discharge end of said nozzle. Fig. 8 is a side view of the engine looking at the right-hand side of Fig. 1. Fig. 9 is a vertical section of same on the dotted line 9 9 of Fig. 8; and Fig. 10 is a detached top view of the governing devices and pump, this figure being partly in section through the main wheel on the driving-shaft of the engine.

In the drawings, 20 designates the cylinder of the engine; 21, the piston therein; 22, the piston-rod; 23, the crank-chamber; 24, one section of the main shaft; 25, the other section of said shaft; 26, corresponding counterbalance-disks secured upon the facing ends of the shaft-sections 24 25; 27, a pin connecting said disks 26 and upon which one end of the piston-rod 22 is secured; 28, a wheel on the shaft-section 24 and from which the pump-plunger and governing devices receive their motion, and 29 a chambered cylinder-head fitted to the cylinder 20 and receiving the discharge end of the nozzle, (numbered as a whole 30,) through which the oil is delivered to the chamber of said head 29 and which by the customary pipe connection is supplied with the oil from a pump 31, also of usual construction.

The cylinder 20 is mounted over the crank-chamber 23 and is open at its lower end, while at its upper end said cylinder 20 is closed by the head 29, whose edges are secured upon the upper edges of said cylinder and whose middle portion fits within the interior of the upper end of said cylinder and is formed at one side with the vaporizing-dome 32, which is shown as of conoidal form and has an unrestricted orifice and is elongated or has its greatest lateral dimension or diameter as a chord of or in substantial parallelism with the circumferential wall of the cylinder and its smallest lateral dimension or diameter at right angles to such wall or on a radial line of the circumference of such wall, as indicated in Figs. 2 and 9. The nozzle 30 passes through the upper end of the cylinder 20 and has its discharge end within the dome 32 about midway of the height of said dome.

The cylinder 20 is formed with a port or passage 33, leading from the interior of the crank-chamber 23 to a point above the piston 21 when the latter is in its lower position, as shown in Fig. 2, and opposite to the upper end of the air-port 33 is provided an exhaust-port 34, the latter also being in a position to appear above the piston 21 when the latter is in its lower position.

The piston 21 is of cup form or hollow, and the piston-rod 22 is pivotally connected with it by means of a suitable transverse pin 35, as clearly illustrated. The lower end of the piston-rod 22 has a suitable bearing 36 connected with it, as shown in Fig. 2, and this bearing 36 is mounted upon the crank-pin 27, by which the counterbalance-disks 26 are at one side of the shaft-sections 24 25 connected together, so that during the operation of the engine the piston-rod 22, crank-pin 27, disks 26, and shaft-sections 24 25 may have simultaneous motion.

The crank-chamber 23 is formed of a substantially semicircular lower section 37 and a substantially semicircular upper section 38, and these two sections are flanged, as shown, at their meeting edges and are securely bolted together, so as to form the complete chamber 23, inclosing the counterbalance-disks 26, the counterbalance-disks 26 substantially filling the interior of the chamber 23, but not so fully as to prevent air from entering said chamber. It is my purpose that sufficient air shall enter the chamber 23 during each upstroke of the piston 21 to insure the proper operation of the engine, as hereinafter described, and hence at one side of the chamber 23 I provide an automatic check-valve 39, adapted to open inwardly under the suction created by the upward movement of the piston 21 and then close outwardly during the descent of said piston against the flanged edges of the plate 40, carrying said valve 39.

The valve 39 may be of any suitable construction, and I illustrate it as being a leather disk slightly stiffened by means of radial wires 41, Fig. 4, and a circular wire 42, to which the outer ends of said radial wires are fastened. The purposes of the wires 41 42 is to stiffen the leather disk and impart to the same a spring action tending to cause the disk to close against the plate 40. The valve 39 is an ordinary check-valve, and my invention is not limited to any special construction of the check-valve 39 for opening inwardly to admit air during the upstroke of the piston 21 and moving outwardly to close against its seat after the suction created by the piston 21 has ceased to exist.

The lower and upper sections 37 38 of the crank-chamber 23 are formed with bearings for the shaft-sections 24 25, as shown in Fig. 9, and upon the outer end of the shaft-section 24 is keyed a fly-wheel 28.

The nozzle 30 is supplied with the oil through a pipe 43 from the pump 31, and said nozzle comprises the outer cap-section 44, the intermediate section 45, which enters the wall of the cylinder 20, and the inner point-section 46, containing a central bore receiving the plug 47, the latter closely fitting the bore of said section 46 and having at one side of its outer end the deflecting-lip 48, (more clearly represented in Figs. 6 and 7,) by which the vapor is caused to discharge upwardly, downwardly, and laterally at one side of the chamber formed within the dome 32, and this special manner of discharging said vapor I deem important in securing the best results from the engine. The plug 47 at one edge is formed with the longitudinal channel 49, into which the spirally-arranged crossing-channels 50 enter, it being the purpose of the plug 47 to close the discharge end of the nozzle 30 except at the passage 49, which is fed from the spiral passages 50 and terminates at the central portion of the deflecting-lip 48. Within the interior of the nozzle 30 are formed the passages 51 52 for the oil, and intermediate the facing ends of said passages is provided a ball-valve 53, which under the action of the pump 31 may move from its seat against the stress of a spring and allow the flow of the oil from the passage 51 of the section 45 into the passage 52 of the section 46, said ball-valve 53 automatically closing against its seat when not subjected to the action of the pump 31.

The pump 31 is mounted upon the upper left-hand box for the shaft-section 24, and the plunger-rod 54 of this pump, which is of the usual character, is operated, through suitable devices to be hereinafter described, from the fly-wheel 28, the said rod 54 having its outer end projected through an opening in a supporting and guiding frame 55 (more clearly shown in Fig. 10) and being provided with a coiled spring 56, normally pressing said rod 54 outwardly. Encompassing the hub of the wheel 28 is arranged a frame 57, whose upper portion, as shown in Figs. 9 and 10, contacts with the outer end of the plunger-rod 54, and whose lower portion, as shown in Fig. 9, is formed with an arm 58, which is pivotally secured to a bracket-arm 59, extending outwardly from the engine structure. The frame 57 is adapted to have a pivotal movement from the pivot or hinge 60 and by its movement in one direction to drive the plunger-rod inwardly for the purpose of supplying the requisite quantity of oil with each rotation of the fly-wheel 28 to the nozzle 30, it being understood, of course, that only a small quantity of the oil is driven into the nozzle 30 at each rotation of the wheel 28. The frame 57 is moved inwardly against the plunger-rod 54 by means carried by the fly-wheel 28 and is moved outwardly in a direction from the pump 31 by the action of the rod itself under the influence of the coiled spring 56 thereon. It may be mentioned, however, that I provide means for manually operating the frame 57, this being desirable during the first starting of the engine into operation, and in Fig. 10 it will be seen that the frame 57 is provided with a rod 61, extending through a portion of the frame 55 and having at its outer end a nut 62, between which and a shoulder on the frame 55 is disposed the inner end of a hand-lever 63. By working the hand-lever 63 the frame 57 may be caused to operate the pump-plunger 54, and looking at Fig. 10 it will be seen that if the outer end of the lever 63 is moved toward the left its inner end, acting through the nut 62 and the rod 61, will pull the frame 57 against the end of the plunger 54, driving the latter inwardly, and that then the pressure on the lever 63 being released the spring 56 will restore the plunger-rod, frame 57, and lever 63 to their normal position shown. The device 64 is simply a latch, which may be referred to hereinafter. The frame 57, by which the plunger-rod is actuated, has the upper curved or cam surfaces 65, whereat said frame receives the impact of the devices carried by the fly-wheel 28, which operate it.

The means carried by the fly-wheel for operating the oil-feeding pump are separately shown in Fig. 3 in the position corresponding to the upper dead-center of the main crank and in Fig. 10 in a position slightly in advance of such upper dead-center. In Fig. 9 these means so far as they appear are in correspondence with the lower dead-center position in which the main crank is shown in this view. These means include a frame 66, secured upon the inner face of the fly-wheel 28 and encircling the hub of said wheel and having at its opposite sides the concentric slots 67 to receive the bolts 68, by which the frame 66 is secured to said fly-wheel 28. The object of the slots 67 is to enable the adjustment of the frame 66 on the line of a circle as may be required. The frame 66 at one end of its upper portion has hinged to it upon a bolt 69, Fig. 3, a bar 70, carrying at its outer end a roller 71, which during the rotation of the fly-wheel 28 passes against the cam-surface 65 of the frame 57 for moving said frame inwardly against and to actuate the plunger-rod 54.

To the frame 66 is pivotally secured a lever-arm 72, Fig. 3, to which is pivotally connected a sliding wedge plate or cam 73, whose inner end is adapted to pass between the upper bar of the frame 66 and the adjacent side of the roller 71 for the purpose of pressing said roller 71 outwardly toward the frame 57, with which said roller coöperates. The plate 73 is guided in its movement on a screw 74, which enters a slot in said plate, as shown in Fig. 3, and serves to support and guide the outer end or wedge portion of said plate. The plate 73 receives its sliding motion from the lever-arm 72, and the upper end of the arm 72 is given a normal spring tension in a direction toward the roller 71 by means of a spring 75, secured at one end to said lever 72 and at the other end upon the bolt 69. Upon the upper bar of the frame 66 is pivotally mounted a governor-arm 76, having a leg member 77, upon which is applied an adjustable weight 78. The upper portion of the governor-arm 76 is formed with outwardly-turned lugs 79 80, which extend along the inner edges of the lever-arm 72 and are adapted during the rotation of the fly-wheel 28 to act on said arm 72. The position of the cam-plate 73 with respect to the roller 71 governs the action of said roller against the cam-surface 65 of the frame 57, and hence the cam-plate 73 in respect of its position with relation to the roller 71 will affect the action of the pump-plunger 54. The relation of the plate 73 with respect to the roller 71 will vary with the speed of the fly-wheel 28 and the position of the weight 78 on the leg 77 of the governor-arm 76. During the rotation of the wheel 28 the centrifugal action will tend to actuate the governor-arm 76, and any movement outward or inward of the governor-arm 76 will affect the position of the lever-arm 72, the spring 75 constantly drawing said lever-arm 72 against one or the other, or both, lugs 79 80 of the governor-arm. Normally the tension of the spring 75 will be about counterbalanced by the weight 78, allowing the lever 72 to maintain the plate 73 in an initial relation to the roller 71; but with an increase of speed in the fly-wheel 28 the governor-arm 76 will turn outwardly and cause the lug 80 thereof to move the arm 72 outwardly against the stress of the spring 75, this action withdrawing to a greater or less extent the wedge end of the plate 73 from behind the roller 71 and lessening the action of said roller against the frame 57 and pump-plunger 54, whereby said plunger 54 will be enabled to deliver a smaller quantity of the oil to the nozzle 30, the amount of fuel supplied for running the engine being thus reduced. When the wedge or cam end of the plate 73 is entirely withdrawn from behind the roller 71, the latter will no longer operate on the frame 57, and the pump-plunger 54 will then cease to act. Upon a decrease of speed in the wheel 28 the weight 78 on the governor-arm 76 will approach nearer to the hub of said wheel, and this will allow the spring 75 to more fully move the wedge or cam end of the plate 73 behind the roller 71, and thereby move said roller outwardly toward the ring or cam frame 57, with the result of increasing the movement of the pump-plunger 54 and likewise increasing the quantity of oil delivered by the pump 31 to the nozzle 30. A regulated feed of the oil to the nozzle 30 is thus secured, and the weight 78 on the governor-leg 77 may be adjusted to suit the desired speed for the engine.

Preliminary to starting the engine the head 29 must be heated, so that the first oil-supply through the nozzle 30 will vaporize when injected into the dome 32 of said head. After the head 29 has been sufficiently heated for the purpose indicated the operator will start the flow of oil from the pump 31 by giving the hand-lever 63 a few strokes, and then he will give the fly-wheel 28 a rotation. It may be here stated that the wheel 28 may be rotated in either direction, since the engine will operate with entire satisfaction in both directions without alteration or change in its parts. During the upstroke of the piston 21 a slight vacuum will be formed in the crank-chamber 23, sufficient to open the air-check valve 39 and permit the air to fill into said chamber. On the following downstroke of the piston 21 the latter will compress the air below it, and when said piston attains its lower position it will uncover the upper end of the air-port 33 and also expose the exhaust 34, and upon the said piston 21 reaching its lower position the compressed air below it will rush upwardly through the port 33 and be swept upwardly along one side of the cylinder by means of the deflector-plate 81, Fig. 2, fastened upon the piston-head, the air entering the dome 32 and then moving downwardly at the opposite side of the deflector-plate 81 and escaping through the exhaust 34, cleaning out the dome and upper end of the cylinder and filling the latter and the dome 32 with fresh air. When the piston-head again moves to its upper position, it compresses the fresh air in the dome 32 and upper end of the cylinder, and when the said piston has reached its highest point and is ready to again move downwardly the pump-plunger 54 acts to deliver a small quantity of oil through the sections of the nozzle 30, this causing the discharge of the vapor at the plug 47 and resulting in the usual explosion. The lip 48 of the plug 47 causes the said vapor to be deflected upwardly, downwardly, and laterally at one side of the chamber in the dome 32, leaving the fresh air on the other side of said chamber to coact with the said vapor in a very perfect manner. The operation of the piston 21 will be repeated with every rotation of the wheel 28, and after a few explosions at the point of the nozzle 30 the discharge end of this nozzle will attain a red heat, which will be maintained by the successive explosions. The vapor discharged at the plug 47 ignites the moment it meets the compressed air in the head 29. The ignition of the vapor is made positive by the compression of the air in the chamber of the dome 32, and on each downstroke of the piston 21 the remains of the explosion or ignition are swept from the dome 32 and upper portion of the cylinder 20 in the manner above described by the fresh air ascending through the port 33 and exhausting through the port 34.

The engine may be stopped by turning the latch 64, Fig. 10, over upon the inner end of the lever 63 and the shoulder of the frame 55, with which said lever at its inner end contacts, and then moving the outer end of the lever 63 toward the left, whereby the frame 57 and plunger-rod 54 are moved inwardly toward the pump 31, and the small arm on the latch 64 is permitted to fall into the space between the then extreme inner end of the lever 63 and said shoulder, forming simply a plug to prevent the spring 56 on the plunger-rod from returning the frame 57 outwardly, this plug holding the inner end of the lever 63 in its then inner position against the nut 62.

The check-valve 39 is shown as being in the wall of the chamber 23; but it is obvious that I may locate said valve elsewhere at a point from which the air may be admitted to below the piston.

The engine hereinbefore described, both in its operation and in the construction and arrangement of its parts, possesses a number of advantages, and among these it may be mentioned that the oil or vapor is only discharged into the chamber of the dome 32 when the piston is in its upper position and is, with the crank-pin 27, ready to descend on its working stroke, whereby preignition is entirely avoided. The full efficiency of the ignition in driving the engine is secured and the power of the engine is not consumed in carrying the piston upwardly against the resistance due to the ignition when the latter takes place, as it does in many engines in the prior art before the piston has attained its upstroke. Another advantage of the invention is that when the piston reaches its lower position all of the combustion products are swept from the cylinder and dome above the piston, leaving the same filled with pure air only as distinguished from a mixture of air and gas or vapor or other explosive, the result of which is that since no oil is admitted to the dome 32 until the piston reaches its upper position there can be no ignition or explosion from any cause until just the desired moment, and in the present case the desired moment for the ignition to take place is under absolute control, the discharge of the oil into the dome 32 being timed with the action of the piston. In the use of my engine only enough oil is admitted at a time into the dome 32 for one ignition of sufficient power to give the piston its proper action, and hence there is no waste of fuel to be swept out through the discharge-exit 34. It will be observed on reference to Fig. 2 that the deflector-plate 81, carried by the piston, is below and at one side of a central vertical line through the chamber in the dome 32 and that the lower end of this chamber is open, and the result of such construction and arrangement is that at the termination of each downstroke of the piston the air entering through the port 33 and striking the deflector-plate 81 will be caused to pass upwardly along one side of the cylinder and said chamber and down the opposite side thereof to the discharge-port, effectually cleaning out both said cylinder and chamber. The walls of the ignition-chamber in the dome 32 diverge downwardly and outwardly, and this not only aids the incoming air to clean out said chamber, but at the time of ignition directs the lines of force against the piston in a manner increasing the efficiency of the engine. The entire cylinder-head 29, within which the vaporizing-dome 32 is formed, is of advantage. It sets downward into the end of the cylinder and has the dome 32 located at one side of its center, leaving abundant space at the left-hand side of said dome (looking at Fig. 2) for access to the exterior of the wall of the dome for heating by external means preliminary to starting the engine, said surface being opposite to the discharge end of the nozzle 30 and in position to act upon the oil-vapor forced therefrom. The setting of the head 29 within the end of the cylinder and the disposal of the dome 32 at one side of the center thereof also results in two further advantages, one being that the nozzle 30 may be given the minimum length, especially in that part thereof extending inwardly from its ball-valve, and the other being that said nozzle may extend through both the wall of the cylinder and the side of the dome 32, said nozzle at its outer portion being firmly held in the wall of the cylinder and at said portion receiving the cooling effect of its contact with said wall, which, as usual, is water-jacketed, while the inner portion of said nozzle extends through a free aperture in the side of the dome 32, as shown in Fig. 2, this aperture serving to form a chamber around the nozzle and exposing the length of the discharge-section of the nozzle to the action of the heat of the chamber within the dome 32. I desire also to call attention to the fact that the oil unmixed with air is forced in regulated charges directly into the ignition-chamber of the dome 32 and that the engine as a whole is substantially valveless and devoid of complexity.

The fuel I prefer to employ for the engine is 150° water-white kerosene-oil.

The fuel feeding and governing means hereinbefore described are not claimed herein, but are to be made the subject of a separate application for Letters Patent.

What I claim as my invention, and desire to secure by Letters Patent, is—

1. In an engine of the character described, the piston, the cylinder having the explosion-chamber at its outer end, the inlet-nozzle for the vapor to said chamber, means for admitting air to the outer portion of the cylinder after the piston recedes therefrom to be compressed into said chamber on the succeeding outstroke of the piston, and an exhaust from said cylinder, said nozzle having in its discharge end the plug 47 provided at one side with the outlet 49 and the deflecting-lip 48, combined with means for feeding the oil, and a driving-shaft operatively connected with said piston, substantially as set forth.

2. In an engine of the character described, the piston, the cylinder having the explosion-chamber at its outer end, the inlet-nozzle for the vapor to said chamber, means for supplying the air, and an exhaust, said nozzle comprising the sections 45, 46, having the passages 51, 52, the valve 53 intermediate said passages and the plug 47 within the discharge end of said section 46 and having the several channels 50 and longitudinal channel 49, combined with means for feeding the oil, and a driving-shaft, operatively connected with said piston, substantially as set forth.

3. In a two-cycle oil-engine, the combination of a cylinder and piston, the cylinder having a vaporizer at one end thereof, the vaporizer having a substantially unrestricted opening into the cylinder, a feed-nozzle having its discharge end within the vaporizer, means for charging the cylinder with air at a position of the piston remote from the vaporizer, and means for discharging oil from the feed-nozzle substantially at the position of the piston in closest proximity to the vaporizer.

4. In a two-cycle oil-engine, the combination of a cylinder and piston, the cylinder having a vaporizer at one end thereof, the vaporizer having a substantially unrestricted opening into the cylinder and having such opening disposed eccentrically with one side in proximity to a portion of the wall of the cylinder and the other side at a considerable distance from the opposite portion of the wall of the cylinder, a feed-nozzle discharging into the vaporizer, the cylinder having an air-inlet port located in substantial alinement with the portion of the wall of the cylinder to which the opening of the vaporizer is in closest proximity and so as to be open at a position of the piston remote from the vaporizer, and the cylinder also having an exhaust-port, and an air-deflector on the piston located in proximity to the inlet-port so as to deflect air entering at the inlet-port and deflect the same along the wall of the cylinder and into the vaporizer at the side thereof in proximity to such wall.

5. In a two-cycle oil-engine, the combination of a cylinder and piston, the cylinder having a vaporizer at one end thereof, the vaporizer having a substantially unrestricted opening into the cylinder and having such opening disposed eccentrically with one side in proximity to a portion of the wall of the cylinder and the other side at a considerable distance from the opposite portion of the wall of the cylinder, a feed-nozzle having its discharge end within the vaporizer, the cylinder having an air-inlet port located in substantial alinement with the portion of the wall of the cylinder to which the opening of the vaporizer is in closest proximity and so as to be open at a position of the piston remote from the vaporizer, and the cylinder also having an exhaust-port, an air-deflector on the piston located in proximity to the inlet-port so as to deflect air entering at the inlet-port and deflect the same along the wall of the cylinder and into the vaporizer at the side thereof in proximity to such wall, and means for discharging oil from the feed-nozzle substantially at the position of the piston in closest proximity to the vaporizer.

6. In a two-cycle oil-engine, the combination of a cylinder and piston, the cylinder having a vaporizer at one end thereof, the vaporizer having a substantially unrestricted opening into the cylinder and being elongated in substantial parallelism to the wall of the cylinder and having its opening into the cylinder disposed eccentrically with one side in proximity to a portion of the wall of the cylinder and the other side at a considerable distance from the opposite portion of the wall of the cylinder, a feed-nozzle discharging into the vaporizer, the cylinder having an air-inlet port located in substantial alinement with the portion of the wall of the cylinder to which the opening of the vaporizer is in closest proximity and so as to be open at a position of the piston remote from the vaporizer, and the cylinder having an exhaust-port, and an air-deflector on the piston located in proximity to the inlet-port so as to deflect air entering at the inlet-port and deflect the same along the wall of the cylinder and into the vaporizer at the side thereof in proximity to such wall.

7. In a two-cycle oil-engine, the combination of a cylinder and piston, the cylinder having a vaporizer at one end thereof, the vaporizer having a substantially unrestricted opening into the cylinder and being elongated in substantial parallelism with the wall of the cylinder and having its opening into the cylinder disposed eccentrically with one side in proximity to a portion of the wall of the cylinder and the other side at a considerable distance from the opposite portion of the wall of the cylinder, a feed-nozzle having its discharge end within the vaporizer, the cylinder having an air-inlet port located in substantial alinement with the portion of the wall of the cylinder to which the opening of the vaporizer is in closest proximity and so as to be open at a position of the piston remote from the vaporizer, and the cylinder also having an exhaust-port, an air-deflector on the piston located in proximity to the inlet-port so as to deflect air entering at the inlet-port and deflect the same along the wall of the cylinder and into the vaporizer at the side thereof in proximity to such wall, and means for discharging oil from the feed-nozzle substantially at the position of the piston in closest proximity to the vaporizer.

8. In an oil-engine, the combination of a cylinder and piston, the cylinder having a vaporizer at one end thereof, the vaporizer opening into the cylinder, a feed-nozzle discharging into the vaporizer and having a discharge-channel and a plurality of feed-channels therefor, means for charging the cylinder with air, and means for discharging oil from the feed-nozzle.

9. In an oil-engine, the combination of a cylinder and piston, the cylinder having a vaporizer at one end thereof, the vaporizer opening into the cylinder, a feed-nozzle discharging into the vaporizer and having a discharge-channel and a plurality of feed-channels therefor and having deflecting means for directing its discharge from such discharge-channel, means for charging the cylinder with air, and means for discharging oil from the feed-nozzle.

10. In a two-cycle oil-engine, the combination of a cylinder and piston, the cylinder having a vaporizer at one end thereof and opening into the cylinder and having such opening disposed eccentrically with one side in proximity to a portion of the wall of the cylinder and the other side at a considerable distance from the opposite portion of the wall of the cylinder, a feed-nozzle discharging into the vaporizer and having a discharge-channel and a plurality of feed-channels therefor, the cylinder having an air-inlet port located in substantial alinement with the portion of the wall of the cylinder to which the opening of the vaporizer is in closest proximity and so as to be open at a position of the piston remote from the vaporizer, and the cylinder also having an exhaust-port, and an air-deflector on the piston located in proximity to the inlet-port so as to deflect air entering at the inlet-port and deflect the same along the wall of the cylinder and into the vaporizer at the side thereof in proximity to such wall, and means for discharging oil from the feed-nozzle.

11. In a two-cycle oil-engine, the combination of a cylinder and piston, the cylinder having a vaporizer at one end thereof, the vaporizer having a substantially unrestricted opening into the cylinder and being elongated in substantial parallelism to the wall of the cylinder and having its opening into the cylinder disposed eccentrically with one side in proximity to a portion of the wall of the cylinder and the other side at a considerable distance from the opposite portion of the wall of the cylinder, a feed-nozzle discharging into the vaporizer and having a discharge-channel and a plurality of feed-channels therefor and having deflecting means for directing its discharge from such discharge-channel, the cylinder having an air-inlet port located in substantial alinement with the portion of the wall of the cylinder to which the opening of the vaporizer is in closest proximity and so as to be open at a position of the piston remote from the vaporizer, and the cylinder also having an exhaust-port, an air-deflector on the piston located in proximity to the inlet-port so as to deflect air entering at the inlet-port and deflect the same along the wall of the cylinder and into the vaporizer at the side thereof in proximity to such wall, and means for discharging oil from the feed-nozzle, substantially as set forth.

12. In an oil-engine, the combination of a piston, cylinder and cylinder-head, the cylinder-head entering the cylinder a substantial distance and having a vaporizing-dome formed thereon, the vaporizing-dome opening into the cylinder and being of increasing dimensions toward such opening and being located eccentrically on the cylinder-head with one side in proximity to a portion of the wall of the cylinder and the other side at a considerable distance from the opposite portion of the wall of the cylinder and so as to provide exteriorly to said dome a recess in the cylinder-head for access to the exterior of the dome, a feed-nozzle having its discharge end within the vaporizer, means actuated by the engine for discharging oil through such feed-nozzle, and means for charging the cylinder with air.

In testimony whereof I have affixed my signature in presence of two witnesses.

HENRY SOELDNER.

Witnesses:

HENRY D. WILLIAMS,
HERBERT H. GIBBS.